(12) United States Patent
Soon-Shiong

(10) Patent No.: US 12,511,582 B2
(45) Date of Patent: Dec. 30, 2025

(54) CURATION AND PROVISION OF DIGITAL CONTENT

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 19/042,498

(22) Filed: Jan. 31, 2025

(65) Prior Publication Data

US 2025/0181647 A1 Jun. 5, 2025

Related U.S. Application Data

(63) Continuation of application No. 18/751,969, filed on Jun. 24, 2024, now Pat. No. 12,293,269, which is a
(Continued)

(51) Int. Cl.
*G06N 20/00* (2019.01)
*G06F 16/25* (2019.01)
(Continued)

(52) U.S. Cl.
CPC .......... *G06N 20/00* (2019.01); *G06F 16/25* (2019.01); *G06F 16/9035* (2019.01);
(Continued)

(58) Field of Classification Search
None
See application file for complete search history.

(56) References Cited

U.S. PATENT DOCUMENTS

| | | |
|---|---|---|
| 6,640,218 B1 | 10/2003 | Golding et al. |
| 7,683,759 B2 | 3/2010 | Martis et al. |

(Continued)

FOREIGN PATENT DOCUMENTS

WO    2012129372 A2    9/2012

OTHER PUBLICATIONS

Lops, Pasquale, Marco De Gemmis, and Giovanni Semeraro. "Content-based recommender systems: State of the art and trends." Recommender systems handbook (2011): 73-105. (Year: 2011).*

(Continued)

*Primary Examiner* — Vincent Gonzales
(74) *Attorney, Agent, or Firm* — Harness Dickey & Pierce P.L.C.

(57) ABSTRACT

A method includes accessing a structured content item from a first database and event data from a second database, the event data including sets of event attributes in a multi-dimensional namespace and associated with a respective point in time; determining a relevancy profile characterizing a metric of relevancy of the structured content item over a respective time interval, the metric of relevancy including a distance in the multi-dimensional namespace between attributes associated with the structured content and the sets of event attributes; generating, using the relevancy profile, second digital content including a subset of the structured content item; and providing the second digital content for rendering on a device. Related apparatus, systems, techniques and articles are also described.

20 Claims, 3 Drawing Sheets

Related U.S. Application Data continuation of application No. 18/221,573, filed on Jul. 13, 2023, now Pat. No. 12,061,653, which is a continuation of application No. 16/678,212, filed on Nov. 8, 2019, now Pat. No. 11,748,417.

(60) Provisional application No. 62/759,954, filed on Nov. 12, 2018.

(51) Int. Cl.
  *G06F 16/9035* (2019.01)
  *G06F 17/00* (2019.01)
  *G06F 18/21* (2023.01)
  *G06F 18/24* (2023.01)
  *G06N 5/048* (2023.01)

(52) U.S. Cl.
  CPC .......... *G06F 17/00* (2013.01); *G06F 18/2178* (2023.01); *G06F 18/24* (2023.01); *G06N 5/048* (2013.01)

(56) References Cited

U.S. PATENT DOCUMENTS

| | | | |
|---|---|---|---|
| 9,002,858 B1 * | 4/2015 | Dassa | G06F 16/958 |
| | | | 707/750 |
| 9,196,148 B1 | 11/2015 | Hutz | |
| 9,262,719 B2 | 2/2016 | Soon-Shiong | |
| 9,390,128 B1 | 7/2016 | Seetala | |
| 9,436,738 B2 | 9/2016 | Ehsani et al. | |
| 9,530,100 B2 | 12/2016 | Soon-Shiong | |
| 9,576,242 B2 | 2/2017 | Soon-Shiong | |
| 9,659,104 B2 | 5/2017 | Soon-Shiong et al. | |
| 9,916,290 B2 | 3/2018 | Soon-Shiong et al. | |
| 2008/0027921 A1 | 1/2008 | Chandrasekar et al. | |
| 2008/0263029 A1 | 10/2008 | Guha et al. | |
| 2011/0112416 A1 | 5/2011 | Myr | |
| 2012/0117116 A1 | 5/2012 | Jacobson et al. | |
| 2013/0173306 A1 | 7/2013 | Sasidhar | |
| 2014/0115515 A1 | 4/2014 | Adams et al. | |
| 2014/0172864 A1 | 6/2014 | Shum | |
| 2015/0269321 A1 | 9/2015 | Soon-Shiong et al. | |
| 2015/0310228 A1 | 10/2015 | Benz et al. | |
| 2015/0332283 A1 | 11/2015 | Witchey | |
| 2016/0072800 A1 | 3/2016 | Soon-Shiong et al. | |
| 2016/0147941 A1 | 5/2016 | Ueda et al. | |
| 2016/0342898 A1 | 11/2016 | Ehsani et al. | |
| 2017/0281277 A1 | 10/2017 | Gregg et al. | |
| 2018/0082043 A1 | 3/2018 | Witchey et al. | |
| 2019/0051412 A1 | 2/2019 | Kano et al. | |
| 2019/0159733 A1 | 5/2019 | Shusterman | |
| 2019/0385213 A1 | 12/2019 | Pande et al. | |
| 2020/0151501 A1 | 5/2020 | Soon-Shiong | |
| 2023/0359673 A1 | 11/2023 | Soon-Shiong | |
| 2024/0346085 A1 | 10/2024 | Soon-Shiong | |

OTHER PUBLICATIONS

Muralidhar, Nikhil, Huzefa Rangwala, and Eui-Hong Sam Han. "Recommending temporally relevant news content from implicit feedback data." In 2015 IEEE 27th International Conference on Tools with Artificial Intelligence (ICTAI), pp. 689-696. IEEE. (Year: 2015).*

McNee, Sean M., Shyong K. Lam, Catherine Guetzlaff, Joseph A. Konstan, and John Riedl. "Confidence Displays and Training in Recommender Systems." In Interact, vol. 3, pp. 176-183. 2003. (Year: 2003).*

Cena, Federica, Silvia Likavec, Ilaria Lombardi, and Claudia Picardi. "Should i stay or should i go? Improving event recommendation in the social web." Interacting with Computers 28, No. 1 (2016): 55-72. (Year: 2016).*

Rauchs, Michel, Andrew Glidden, Brian Gordon, Gina C. Pieters, Martino Recanatini, François Rostand, Kathryn Vagneur, and Bryan Zheng Zhang. "Distributed ledger technology systems: A conceptual framework." Available at SSRN 3230013. 2018. (Year: 2018).*

Namahoot, Chakkrit Snae, Michael Brückner, and Naruepon Panawong. "Context-aware tourism recommender system using temporal ontology and naïve bayes." In Recent Advances in Information and Communication Technology 2015: Proc. of the 11th International Conference on Computing and Information Tech. 2015 (Year: 2015).*

Garcin, Florent, Christos Dimitrakakis, and Boi Faltings. "Personalized news recommendation with context trees." In Proceedings of the 7th ACM Conference on Recommender Systems, pp. 105-112. 2013. (Year: 2013).*

Brown et al. ("Exploiting contextual change in context-aware retrieval", Proceedings of the 2002 ACM symposium on Applied computing, 2002, pp. 650-656) (Year: 2002).

Alonso et al. ("Using crowdsourcing for TREC relevance assessment", Information Processing and Management 48, 2012) (Year: 2012).

Dutta et al. ("A Graph Based Clustering Technique for Tweet Summarization", 2015 4th International Conference on Reliability, Infocom Technologies and Optimization (ICRITO) 2015, pp. 1-6) (Year: 2015).

Vivaldi etal. ("Automatic Summarization Using Terminological and Semantic Resources", LREC, 2010, pp. 1-8 (Year: 2010).

Rohit et al. ("Novelty Detection in BBC Sports News Streams", International Journal of Scientific Research in Computer Science Applications and Management studies, vol. 7, Issue 2, Mar. 2018, pp. 1-7) (Year: 2018).

Zhang et al. ("Event detection and popularity prediction in microblogging", Neurocomputing 149, 2015, pp. 1469-1480) (Year: 2015).

Aslam et al. ("TREC 2013 Temporal Summarization", Proceedings of the 22nd Text Retrieval Conference (TREC), Nov. 2013, pp. 1-14) (Year: 2013).

Kedzie et al. ("Predicting Salient Updates for Disaster Summarization", Proceedings of the 53rd Annual Meeting of the Association for Computational Linguistics and the 7th International Joint Conference on Natural Language Processing, China, Jul. 26-31, 2015, pp. 1608-1617) (Year: 2015).

Crescenzi et al. ("Crowdsourcing large scale wrapper inference", Distrib Parallel Databases, vol. 33, 2015, pp. 95-122) (Year: 2015).

Yang et al. ("MARES: multitask learning algorithm for Web-scale real-time event summarization", World Wide Web 22: pp. 499-515, published online Jun. 2, 2018) (Year: 2018).

Venanzi et al. ("Time-Sensitive Bayesian Information Aggregation for Crowdsourcing Systems", Journal of Artificial Intelligence Research 56 (2016), pp. 517-545) (Year: 2016).

Ji etal. ("Big Data Summarization Using Semantic Feature for IoT on Cloud", Contemporary Engineering Sciences, vol. 7, 2014, No. 22, pp. 1095-1096) (Year: 2014).

Tjondronegoro et al. ("Sports Video Summarization using Highlights and Play-Breaks", MIR'03, Nov. 7, 2003, Berkeley, California, pp. 1-8) (Year: 2003).

Tan et al. ("Abstractive Document Summarization with a Graph-Based Attentional Neural Model", Proceedings of the 55th Annual Meeting of the Association for Computational Linguistics, Canada, 2017, pp. 1171-1181) (Year: 2017).

Thali & al. "Virtopsy—Scientific Documentation, Reconstruction and Animation in Forensic: Individual and Real 3D Data Based Geo-Metric Approach Including Optical Body/Object Surface and Radiological CT/MRI Scanning" (2005) J orensic Sci. 50(2):428-42.

Office Action from corresponding U.S. Appl. No. 16/678,212 dated Aug. 19, 2020.

Office Action from corresponding U.S. Appl. No. 16/678,212 dated Dec. 9, 2020.

Office Action from corresponding U.S. Appl. No. 16/678,212 dated Jul. 13, 2021.

Office Action from corresponding U.S. Appl. No. 16/678,212 dated Sep. 28, 2021.

Office Action from corresponding U.S. Appl. No. 16/678,212 dated Jun. 16, 2022.

(56) References Cited

OTHER PUBLICATIONS

Office Action from corresponding U.S. Appl. No. 16/678,212 dated Aug. 16, 2022.
Duan et al. (2018). Neural Network Based Clinical Treatment Decision Support System for Co-existing Medical Conditions. 2018 IEEE Third International Conference on Data Science in Cyberspace (DSC), 131-138.
Inel et al. (2016). Crowdsourcing salient information from news and tweets. In Proceedings of the Tenth International Conference on Language Resources and Evaluation (LREC'16), 3959-3966.
Ye et al. (2018). A crowdsourcing framework for medical data sets. AMIA Summits on Translational Science Proceedings 2018, 273-280.
Raghavan et al. (2006). Active learning with feedback on features and instances. The Journal of Machine Learning Research 7 (2006), 1655-1686.
Venanzi et al. (2016). Time-Sensitive Bayesian Information Aggregation for Crowdsourcing Systems. Journal of Artificial Intelligence Research 56, 517-545.
Wang et al. (2009). Can we learn a template-independent wrapper for news article extraction from a single training site ?. In Proc. 15th ACM Int'l conf, on Knowledge discovery and data mining, 1345-1354.
Jin et al. (2018). A treatment Engine by Predicting Next-Period Prescriptions. KDD2018, 1608-1616.
Jacovi et al. (2018). Understanding convolutional neural networks for text classification. arXiv preprint arXiv: 1809.08037.
Bennett et al. (2010). Data Mining and Electronic Health Records: Selecting Optimal Clinical Treatments in Practice. Proceedings of the 6th International Conference on Data Mining, 313-318.
Gareth et al. (2017). An introduction to statistical learning. New York: springer; corrected 8th printing 2017.
Alonso et al. (2000). Crowdsourcing for Relevance Evaluation. ACM SIGIR Forum, 42( 2).
Lease et al. (2012). Crowdsourcing for information retrieval. In ACM SIGIR Forum, 45(2), 66-75.
Non-Final Office Action from corresponding U.S. Appl. No. 18/221,573 dated Oct. 6, 2023.
Final Office Action from corresponding U.S. Appl. No. 18/221,573 dated Feb. 9, 2024.
Ganesan, Prasanth et al. (2016). Computer-Aided Clinical Decision Support Systems for Atrial Fibrillation. Computer-aided Technologies, Ch. 5.
Non-Final Office Action from U.S. Appl. No. 18/751,969 dated Sep. 6, 2024.
Final Office Action from U.S. Appl. No. 18/751,969 dated Nov. 5, 2024.

\* cited by examiner

CURATION AND PROVISION OF DIGITAL CONTENT

CROSS-REFERENCE TO RELATED APPLICATIONS

This application is a continuation of U.S. patent application Ser. No. 18/751,969 filed on Jun. 24, 2024, which is a continuation of U.S. patent application Ser. No. 18/221,573 filed on Jul. 13, 2023, which is a continuation of U.S. patent application Ser. No. 16/678,212 filed on Nov. 8, 2019, which claims the benefit and priority of U.S. Provisional Application No. 62/759,954 filed on Nov. 12, 2018. The entire disclosures of each of the above applications are herein incorporated by reference.

TECHNICAL FIELD

The subject matter described herein relates to curation of digital content and provision of that curated digital content.

BACKGROUND

The amount of digital content available for consumption has grown along with the growth of computing technology, information infrastructure, and proliferation of digitally connected sensors such as a heart rate monitor integrated into a smart watch. But, with this increase in volume of digital content, identifying content that is relevant to a user has become more challenging.

SUMMARY

In an aspect, a method includes accessing a structured content item from a first database and event data from a second database, the event data including sets of event attributes in a multi-dimensional namespace and associated with a respective point in time; determining a relevancy profile characterizing a metric of relevancy of the structured content item over a respective time interval, the metric of relevancy including a distance in the multi-dimensional namespace between attributes associated with the structured content and the sets of event attributes; generating, using the relevancy profile, second digital content including a subset of the structured content item; and providing the second digital content for rendering on a device.

One or more of the following features can be included in any feasible combination. For example, accessing the structured content item from the first database can include accessing a plurality of structured content items. The relevancy profile can characterize each of the plurality of structured content items over a respective time interval. The metric of relevancy can include distances in the multi-dimensional namespace between the attributes associated with the structured content and the sets of event attributes. The second digital content can include a subset of the plurality of structured content items.

The determining of the relevancy profile can be performed further using at least one predictive model. The at least one predictive model can map the structured content associated attributes to the sets of event attributes. The at least one predictive model can map the sets of event attributes to the structured content associated attributes. The at least one predictive model can include at least one rules set executed by an inference engine. The at least one rules set can include rules operating according to at least one of the following: deductive reasoning, abductive reasoning, case-based reasoning, inductive reasoning, metaphorical mapping, and fuzzy logic. The at least one predictive model can include at least one of: Naive Bayes model, k-nearest neighbor model, majority classifier model, support vector machine model, random forest model, boosted tree model, classification and regression tree model, neural network, and logistic regression model.

An uncertainty measure associated with the determined metric of relevancy of each of the plurality of structured content items over the respective time interval can be determined. That the relevancy metric of the at least one of the plurality of structured content items exceeds a predefined threshold can be determined using the relevancy profile and for at least one of the plurality of structured content items. The second digital content can include content associated with the at least one of the plurality of structured content items for which the relevancy metric exceeds the predefined threshold.

A mechanical turk request characterizing a request for the metric of relevancy of each of the plurality of structured content items over a respective time interval can be received. The mechanical turk request can be converted into a mechanical turk project. Mechanical turk project results can be received from at least one member interface characterizing the metric of relevancy of each of the plurality of structured content items over a respective time interval. The mechanical turk project results can be provide for use in generating the second digital content. The mechanical turk project results can be provided to the predictive model as a supervisory signal to modify the predictive model.

A request for the metric of relevancy of each of the plurality of structured content items over a respective time interval can be received. Results can be received from at least one member interface characterizing the metric of relevancy of each of the plurality of structured content items over a respective time interval. The results can be provided for use in generating the second digital content. The results can be provided to the predictive model as a supervisory signal to modify the predictive model.

An additional structured content item that would improve an uncertainty measure can be identified using the at least one predictive model. Additional digital content associated with the additional structured content item can be requested from a remote resource. At least one of the structured content items can be indicative of one or more of: an image, an xray image, a catscan image, a magnetic resonance image (MRI) dataset, an audio file, an electrocardiogram signal, a heat rate signal, and a structured text. The second digital content can characterize the subset of the plurality of structured content items in a video format. Generating the second digital content can be performed prior to the determinable time of at least one event. The second database can be configured to receive and store additional event data. The additional event data can be accessed from the second database. An updated relevancy profile characterizing the metric of relevancy of at least one of the plurality of structured content items over at least a portion of the respective time interval can be determined. Updated second digital content including a second subset of the plurality of structured content items can be generated using the at least one of the plurality of structured content items and the determined updated relevancy profile. The updated second digital content can be provided for rendering on a device.

The attributes associate with the structured content can characterize: a creation time of the structured content, an open response description of the structured content, a predefined type of content. The first database can include a single database; a distribute database; and/or information stored in or on a distributed ledger. The relevancy profile can characterize relevancy with respect to an absolute time, a relative time, a periodic time, a deterministic time, and/or a scheduled time. Providing the second digital content for rendering on the device can include rendering the subset of the plurality of structured content items within a webpage, a temporal presentation, and/or a video. A location within the webpage, the temporal presentation, and/or the video of each item of the subset of the plurality of structured content can be based on a ranking of the respective metric of relevancy.

In yet another aspect, a system includes a content database storing a plurality of structured content items, the structured content including associated attributes in a multi-dimensional namespace; an event database storing event data characterizing an occurrence happening at a determinable time, the event data including sets of event attributes in the multi-dimensional namespace and each set of event attributes associated with a point in time relative to the determinable time; and a predictive engine including at least one data processor and memory storing instructions, which when executed by the at least one data processor, cause the at least one data processor to perform operations comprising: accessing the plurality of structured content items from the content database and the event data from the event database; determining a relevancy profile characterizing a metric of relevancy of each of the plurality of structured content items over a respective time interval, the metric of relevancy including distances in the multi-dimensional namespace between the attributes associated with the structured content and the sets of event attributes, the determining performed using the plurality of structured content items and the event data; generating, using the plurality of structured content items and the determined relevancy profile characterizing the metric of relevancy of the plurality of structured content items over the time interval, second digital content including a subset of the plurality of structured content items; and providing the second digital content for rendering on a device.

One or more of the following features can be included in any feasible combination. For example, the determining of the relevancy profile can be performed further using at least one predictive model. The at least one predictive model can map the structured content associated attributes to the sets of event attributes. The at least one predictive model can map the sets of event attributes to the structured content associated attributes. The predictive engine can include at least one inference engine and the at least one predictive model includes at least one rules set. The at least one rules set can include rules operating according to at least one of the following: deductive reasoning, abductive reasoning, case-based reasoning, inductive reasoning, metaphorical mapping, and fuzzy logic. The at least one predictive model can include at least one of: Naive Bayes model, k-nearest neighbor model, majority classifier model, support vector machine model, random forest model, boosted tree model, classification and regression tree model, neural network, and logistic regression model.

The operations can further include determining an uncertainty measure associated with the determined metric of relevancy of each of the plurality of structured content items over the respective time interval. The system can include a data interface configured to acquire digital content, convert the digital content into a predetermined structure, and store the converted digital content in the content database as an item in the plurality of structured content items. The data interface can include an N-gram dataset interface configured to receive an N-gram dataset indicative and predictive of fitness of an individual, the fitness including a numerical index representing a composite effect of various health conditions of the individual including interdependencies of the health conditions, the N-gram dataset interface configured to convert the N-gram dataset into at least one structured content items. The data interface can include a health object identifier interface configured to receive a health object identifier including a patient identifier portion and an object identifier portion, the patient identifier portion derived at least in part from biometric data associated with a patient. The data interface can further include an event engine configured to receive attribute data associated with an entity and generate the event data including the sets of event attributes.

The operations can further include: determining, using the relevancy profile and for at least one of the plurality of structured content items, that the relevancy metric of the at least one of the plurality of structured content items exceeds a predefined threshold. The second digital content can include content associated with the at least one of the plurality of structured content items for which the relevancy metric exceeds the predefined threshold. The system can further include a mechanical turk engine including at least one data processor and memory storing instructions, which when executed by the at least one data processor, cause the at least one data processor to perform operations comprising: receive a mechanical turk request characterizing a request for the metric of relevancy of each of the plurality of structured content items over a respective time interval; convert the mechanical turk request into a mechanical turk project; receive mechanical turk project results from at least one member interface characterizing the metric of relevancy of each of the plurality of structured content items over a respective time interval; and provide the mechanical turk project results to the predictive engine for use in generating the second digital content. The predictive engine can be configured to receive the mechanical turk project results and provide the mechanical turk project results to the predictive model as a supervisory signal to modify the predictive model.

The system can further include a user interface engine including at least one data processor and memory storing instructions, which when executed by the at least one data processor, cause the at least one data processor to perform operations comprising: receive a request for the metric of relevancy of each of the plurality of structured content items over a respective time interval; receive results from at least one member interface characterizing the metric of relevancy of each of the plurality of structured content items over a respective time interval; and provide the results to the predictive engine for use in generating the second digital content. The predictive engine can be configured to receive the results from the at least one member interface and provide the results to the predictive model as a supervisory signal to modify the predictive model. The predictive engine can be configured to identify, using the at least one predictive model, an additional structured content item that would improve an uncertainty measure. The system can further include a content enrichment engine including at least one data processor and memory storing instructions, which when executed by the at least one data processor, cause the at least one data processor to perform operations including: receive data characterizing the additional structured content item; and request additional digital content associated with the additional structured content item, the additional digital content requested from a remote resource.

At least one of the structured content items can be indicative of one or more of: an image, an xray image, a catscan image, a magnetic resonance image (MRI) dataset, an audio file, an electrocardiogram signal, a heat rate signal, and a structured text. The second digital content can characterize the subset of the plurality of structured content items in a video format. Generating the second digital content can be performed prior to the determinable time of at least one event. The event database can be configured to receive and store additional event data; and the operations can further include: accessing the additional event data from the event database; determining an updated relevancy profile characterizing the metric of relevancy of at least one of the plurality of structured content items over at least a portion of the respective time interval; generating, using the at least one of the plurality of structured content items and the determined updated relevancy profile, updated second digital content including a second subset of the plurality of structured content items; and providing the updated second digital content for rendering on a device.

The attributes associate with the structured content can characterize: a creation time of the structured content, an open response description of the structured content, and/or a predefined type of content. The content database can include a single database; a distribute database; and/or information stored in or on a distributed ledger. The relevancy profile can characterize relevancy with respect to an absolute time, a relative time, a periodic time, a deterministic time, and/or a scheduled time. Providing the second digital content for rendering on the device can include rendering the subset of the plurality of structured content items within a webpage, a temporal presentation, and/or a video. A location within the webpage, the temporal presentation, and/or the video of each item of the subset of the plurality of structured content can be based on a ranking of the respective metric of relevancy.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
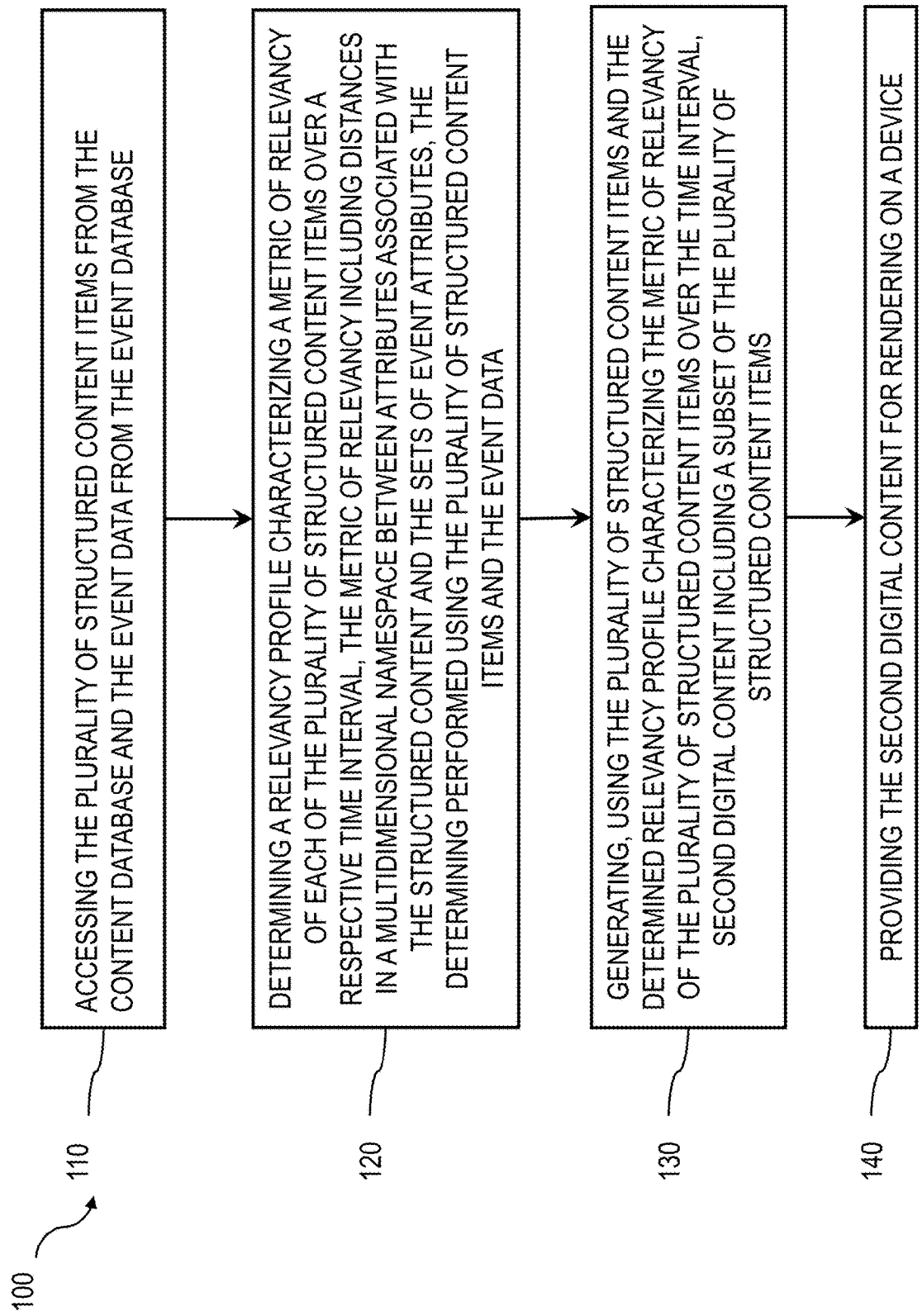
FIG. 1 is a process flow diagram illustrating an example process of generating curated content that can include content relevant to a user at a contextually relevant time.

The current subject matter relates to curating digital content and providing or making the curated content available to a user at contextually relevant times. In some implementations, curation and provision of digital content can include an artificial intelligence self-generated collection of digital content that can be by, for, and/or associated with a user. Curated content can correlate to an individual's schedule or life events. For example, curation of the digital content can include determining which digital content items are relevant to a user, what times they are relevant, what times they will be relevant, and generating additional derivative content, such as a video, that characterizes the relevant content for provision at the relevant time. By curating content according to the current subject matter, understanding of a user's digital information can be improved and timely presentation of the content can be made without requiring lengthy search sessions by the user.

In some implementations, content, which can be continuously created, can be processed into a predefined format and stored in a content database as structured content. The structured content can include attributes (e.g., metadata) that can exist in a multi-dimensional namespace. Similarly, data characterizing events associated with a person can be processed and stored in a content database including event attributes that can differ between points in time. The event attributes can exist in the same multi-dimensional namespace as the structured content attributes, such as in the form of attribute-value pairs. By utilizing a common multi-dimensional namespace for both the structured content attributes and the event attributes, comparisons can be performed between content and events enabling a quantitative metric of relevancy. The namespace can be standardized or normalized to adhere to a well-defined classification or ontology.

In some implementations, machine learning (e.g., predictive modeling), which can include a reasoning engine and/or inference engine, can predict relevancy of content of a user with respect to events associated with the user utilizing the structured content attributes and event attributes that exist within the multi-dimensional namespace. For example, a predictive model can be utilized to learn what content is relevant to a user and when. Similarly, predictive modeling can predict relevancy of events associated with the user to content of the user. For example, a predictive model can be utilized to learn what events are relevant to a user's content as well as what content are relevant to a person's events. By utilizing predictive modeling of relevancy, the current subject matter can include implementations that are capable of learning and improving over time, including improving the determination of what content is or is not relevant.

In some implementations, a neural network can predict relevancy of content of a user with respect to events associated with the user utilizing the structured content attributes and event attributes that exist within the multi-dimensional namespace. For example, the neural network can be utilized to learn what content is relevant to a user and when. Similarly, a neural network can predict relevancy of events associated with the user to content of the user. Example neural networks include convolutional neural networks (CNN), long short-term memory (LSTM) networks, deep reservoir computing and deep echo state networks (deep-ESNs), deep belief networks (DBN), large memory storage and retrieval neural networks (LAMSTAR), deep stacking networks (DSN), tensor deep stacking networks, compound hierarchical-deep models, and deep predictive coding networks (DPCN).

The predictive model can be trained to predict relevancy. For example, training a neural network model can include selecting one model from the set of allowed models that minimizes a cost function. Available algorithms for training neural network models can include use of gradient descent, using backpropagation to compute the actual gradients, including steepest descent (with variable learning rate and momentum, resilient backpropagation); quasi-Newton (Broyden-Fletcher-Goldfarb-Shanno, one step secant); and Levenberg-Marquardt and conjugate gradient (Fletcher-Reeves update, Polak-Ribiére update, Powell-Beale restart, scaled conjugate gradient). Other training techniques can include evolutionary methods, expectation-maximization, non-parametric methods and particle swarm optimization.

In some implementations, an interface can be included to enable curation (e.g., determinations of relevancy) to be provided by a known subject matter expert (e.g., a professional), by the end user, and/or by crowdsourcing. In addition, the input provided by the subject matter expert, the end user, and/or via crowdsourcing can be utilized to further train predictive models.

In some implementations, curated content can be provided regularly (e.g., periodically, from time to time) to the user, such as every morning. The curated content can include an integration of the digital content into a template format. For example, the curated content can be provided in video format (including audio) that includes images showing portions of content and audio describing the portions of content. Curated content can be provided in another format, such as a browser page, presentation, and the like. In some implementations, curated content can be provided in a format (e.g., in a browser, template presentation, and the like) that enables a user to scale the content based on a desired resolution. For example, in some implementations, a user can select a relevancy resolution, enabling a user to view just a limited set of the most relevant information for a time period or to take a deep dive into the curated content and view not just the limited set of most relevant content, but a fuller set of content that, while still may have some relevancy for a given time period, may be deemed less relevant over that time period. Similarly, in some implementations, a user can select a time resolution, enabling a user to view content determined to be relevant over different time periods. Such an interface can allow a user to dynamically explore their curated content in both relevancy and time dimensions.

The subject matter of the digital content can vary. For example, in some implementations, the digital content can include health information, such as x-ray images, cat scans, audio files recording a consultation with a medical professional, electrocardiogram information, heart rate data, personnel motion sensor data (e.g., pedometer), blood pressure information, prescription medicine records, medication adherence, and structured text such as instructions from a medical professional. In some implementations, the digital content can include non-health related information, such as personal photos, collections of social media data, news information, and the like.

In some implementations, the curated content can juxtapose content with upcoming events relevant to the user. For example, the current subject matter can include generating a video that presents recent health related information juxtaposed to a calendar reminder of a doctor's visit.

FIG. 1 is a process flow diagram illustrating an example process 100 of generating curated content that can include content relevant to a user at a contextually relevant time. By curating content according to the current subject matter, understanding of a user's digital information can be improved.

At 110, structured content items can be accessed from a content database and event data can be accessed from an event database. The content database can include a database storing structured content items, which can include digital content (e.g., health information, structured text, audio files, and the like) that have been processed into a predefined format. The predefined format can include attributes (e.g., metadata) associated with the content. For example, structured content of an audio recording can include attributes such as an identity of a speaker within the recording, a time of the recording, a location of the recording, structured text describing the recording, and the like. The content database can include a single database; a distributed database; information stored in or on a distributed ledger, and the like.

In some implementations, the attributes included with the structured content can exist in a multi-dimensional namespace. A multi-dimensional namespace can include a set of symbols that are used to organize objects of various kinds, so that these objects may be referred to by name. The multi-dimensional namespace, which can also be referred to as a multi-dimensional context, can be structured with a hierarchy to allow reuse of attributes in different contexts. Names within the multi-dimensional namespace may not have more than one meaning, although the same name in different dimensionalities of the multi-dimensional namespace can have different meanings, each one appropriate for its dimensional namespace. In some implementations, names in the multi-dimensional namespace can represent objects as well as concepts, the multi-dimensional namespace can characterize a natural or ethnic language, a constructed language, the technical terminology of a profession, a dialect, a sociolect, or an artificial language (e.g., a programming language).

The event database can include event data characterizing an occurrence happening at a determinable time. For example, event data can characterize a calendar entry, such as a doctor's appointment, that includes a time of a start of the appointment. The event data can include sets of event attributes that exist in the multi-dimensional namespace. For example, a set of event attributes associated with the doctor's appoint may include the doctor's identity, the doctor's specialization, a purpose of the doctor's visit, a list of medicines prescribed by the doctor, and the like.

Figure 2A:
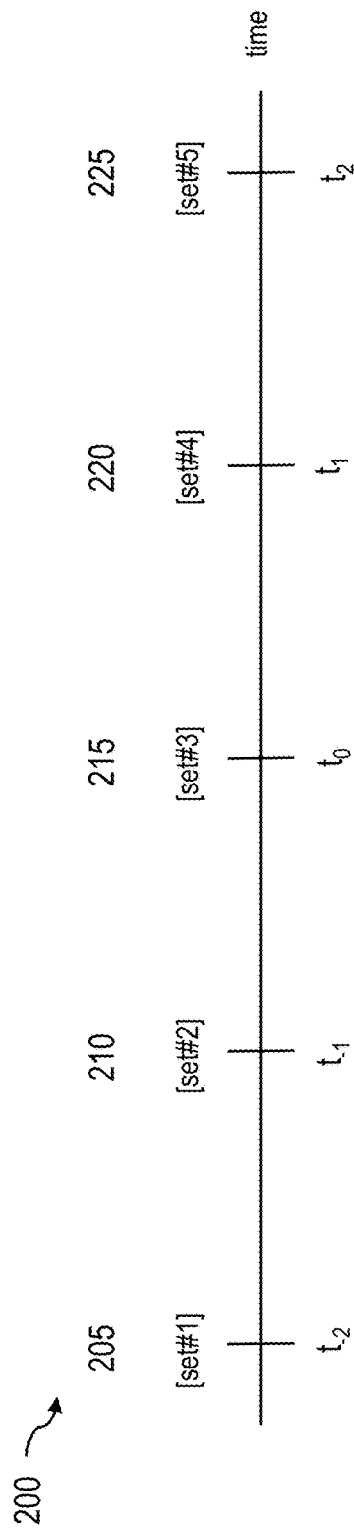
FIG. 2A illustrates a timeline indicating sets of event attributes over time.

Each set of event attributes can be associated with a respective point in time relative to the determinable time. For example, FIG. 2A illustrates a timeline 200 indicating sets of event attributes over time. Time is indicated along the timeline as $t_{-2}$, $t_{-1}$, $t_0$, $t_1$, and $t_2$. The point $t_0$ can indicate the determinable time of the event (e.g., the start of the doctor's appointment), and the other times ($t_{-2}$, $t_{-1}$, $t_1$, and $t_2$) can be measured relative to the determinable time. A set of event attributes (205, 210, 215, 220, 225) can be associated with each time point ($t_{-2}$, $t_{-1}$, $t_0$, $t_1$, $t_2$), respectively. Because a set of event attributes includes a time association, each set of event attributes includes a temporal aspect that can aid in determining relevancy of content, as described more fully below. As an example, the first set of event attributes 205 can indicate a medication that should be taken a certain amount of time (e.g., 6 hours) prior to the appointment.

Referring again to FIG. 1, at 120, a relevancy profile can be determined. The relevancy profile can characterize a metric of relevancy of each of the plurality of structured content items over a respective time interval. Because the structured content includes associated attributes within the multi-dimensional namespace and the event data includes sets of attributes in the multi-dimensional namespace, quantitative comparisons between these attributes can be possible. For example, in some implementations, attributes can be represented as numeric vectors (e.g., using a word to vector transformation function such as Word2Vec). The metric of relevancy can include distances computed in the multi-dimensional namespace between the attributes associated with the structured content and the sets of event attributes. The computed distance can provide for quantitative measure of relevancy between the structured content and the event data. Distance can be computed in a number of ways, such as the L-1 norm, the L-2 norm, Hamming distance, Levenshtein distance, and the like. The relevancy metric can be determined utilizing one or more machine learning techniques, predictive models, neural networks, and the like, as described further below, and which can utilize training.

Accordingly, the relevancy profile can characterize relevancy of content with respect to an event in which relevancy can be a function of time (e.g., a time-varying signal). In some implementations, the relevancy profile characterizes relevancy with respect to an absolute time, a relative time, a periodic time, a deterministic time, and/or a scheduled time.

In some implementations, the determining of the relevancy profile can be performed using at least one machine learning technique, predictive model, neural network, and the like. By utilizing machine learning (e.g., predictive modeling) of relevancy which utilizes training, the current subject matter can include implementations that are capable of learning and improving over time, including improving the determination of what content is or is not relevant. For example, the at least one predictive model can map the structured content associated attributes to the sets of event attributes as a form of a forward chaining inference that infers, from the structured content attributes, to what events the content might be relevant. Similarly, the at least one predictive model can map the sets of event attributes to the structured content associated attributes as a form of a backward chaining inference that infers, from the event data, to what content the events might be relevant.

The predictive model can include any number of techniques for providing a prediction (e.g., an inference, a classification, a regression, and the like). For example, an inference engine can be utilized and the at least one predictive model can include at least one rules set. The rules set can include rules operating according to at least one of the following: deductive reasoning, abductive reasoning, case-based reasoning, inductive reasoning, metaphorical mapping, and fuzzy logic. As additional examples, the at least one predictive model can be the result of a machine learning technique and can include at least one of: Naive Bayes model, k-nearest neighbor model, majority classifier model, support vector machine model, random forest model, boosted tree model, classification and regression tree model, neural network, deep neural network, and logistic regression model. As yet further additional examples, a wide variety of machine learning algorithms can be selected for use as or with the predictive model including algorithms such as support vector regression, ordinary least squares regression (OLSR), linear regression, logistic regression, stepwise regression, multivariate adaptive regression splines (MARS), locally estimated scatterplot smoothing (LOESS), ordinal regression, Poisson regression, fast forest quantile regression, Bayesian linear regression, neural network regression, decision forest regression, boosted decision tree regression, artificial neural networks (ANN), Bayesian statistics, case-based reasoning, Gaussian process regression, inductive logic programming, learning automata, learning vector quantization, informal fuzzy networks, conditional random fields, genetic algorithms (GA), information theory, support vector machine (SVM), averaged one-dependence estimators (AODE), group method of data handling (GMDH), instance-based learning, lazy learning, and maximum information spanning trees (MIST).

The machine learning techniques can utilize training in order to develop the predictive models used for determining relevancy. Training can include initially fitting a model on a set of examples used to fit the parameters (e.g. weights of connections between neurons in artificial neural networks) of the model. The sets of examples can be referred to as the training dataset. The model (e.g. a neural net) can be trained on the training dataset using a supervised learning method (e.g. gradient descent or stochastic gradient descent). The training dataset can include pairs of an input vector (or scalar) and the corresponding output vector (or scalar), which can be commonly denoted as the target (or label). A current model can be run with the training dataset and produce a result, which can then be compared with the target, for each input vector in the training dataset. Based on the result of the comparison and the specific learning algorithm being used, the parameters of the model can be adjusted. The model fitting can include both variable selection and parameter estimation.

Training can include identifying appropriate training data for an individual and development of an initial model. As the model is in production operating to provide relevance of digital content and events, additional feedback on the relevancy can be provided to the production model in the form of a supervisory signal, which can serve to train (e.g., readjust) the production model. The feedback on the relevancy can be provided, for example, by an end user, a subject matter expert, or can be crowdsourced, as described more fully below.

In some implantations, an uncertainty measure associated with the determined metric of relevancy of each item of structured content can be determined. The uncertainty measure can be characterized over time, for example, can be time varying signal. The uncertainty measure can be utilized when determining which structured items of content to include in the curated content. For example, the uncertainty measure for each structured content item can be used as a weight when determining relative relevancy among structured content items. This can provide, for a collection of structured content items, an overall relevancy profile that takes into consideration uncertainty of the predictive model, thereby improving overall predictive performance.

Figure 2B:
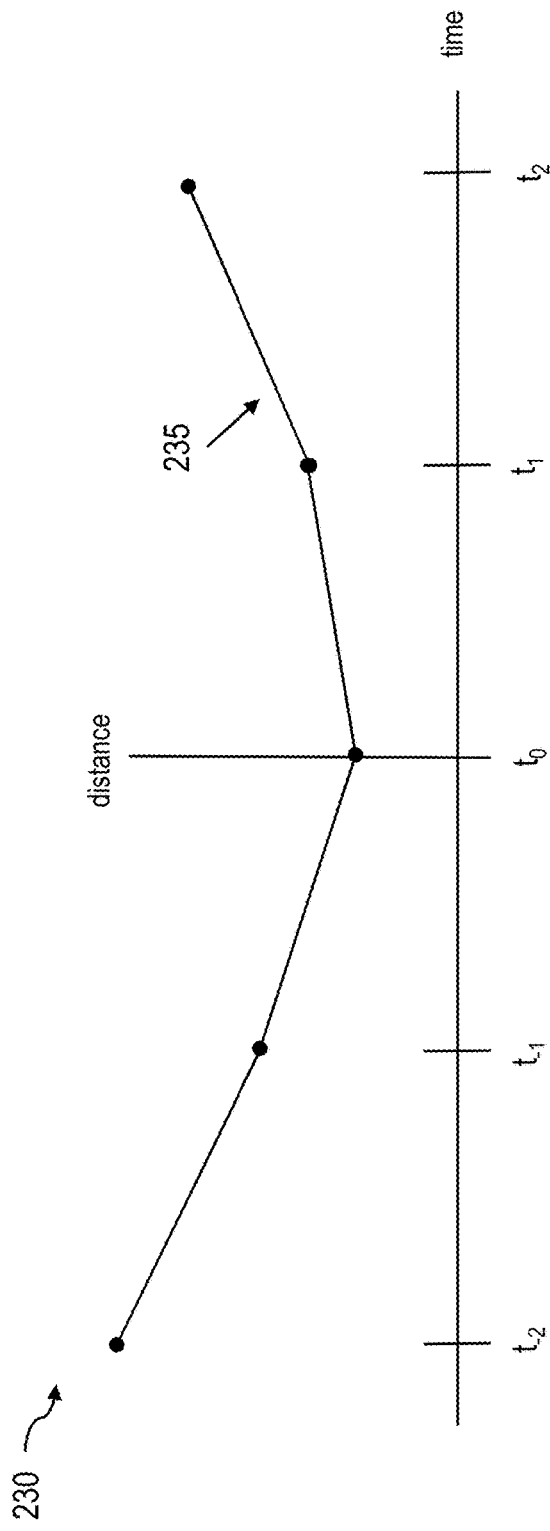
FIG. 2B is a plot illustrating an example relevancy profile for a given structured content and a given event.

FIG. 2B is a plot illustrating an example relevancy profile 230 for a given structured content and a given event. The example relevancy profile 230 includes distance 235 (as computed in the multi-dimensional namespace) between the attributes of the given structured content and the sets of event attributes of the given event data.

In order to determine relevancy of a given item of content across a set of events, a sum or average of the computed distances between the attributes of the structured content and the event attributes of each event in the set of events can be determined. This can provide, for a given item of content, an overall metric of relevancy that is characterized over time. Similarly, to determine relative relevancy of a set of structured content and for a set of events, the sum or average of the computed distances can be determined for each structured content item across all events. This result can enable a ranking, which can vary over time, of relevancy of structured content.

Referring again to FIG. 1, at 130, second digital content (e.g., curated content) can be generated using the structured content items and the determined relevancy profile. The second digital content can be curated for a specific time for provision of the second content. The second digital content can include a subset of the structured content items that are accessed from the content database. The subset of the structured content items can include entire content items or portions thereof, and can be included in the second content based on being considered relevant, which can be determined by assessing whether the metric of relevancy distance for a given structured content item at the time of provision of the content is below or above a threshold, has a relative ranking above a predetermined number (e.g., has a relative relevancy ranking indicating the content is within the top 10 most relevant items), and the like.

At 140, the second digital content (e.g., the curated content) can be provided for rendering on a device at or near a predefined time. For example, the second digital content can be transmitted to a mobile device for rendering in a graphical user interface display space at or near a predefined time. In some implementations, the second digital content can be provided to a ledger data structure, distributed ledger, blockchain, media server, and the like. Providing the second digital content for rendering on the device can include rendering the subset of the plurality of structured content items within a webpage, a temporal presentation, and/or a video. In some implantations, a location within the webpage, the temporal presentation, and/or the video of each item of the subset of the plurality of structured content can be based on a ranking of the respective metric of relevancy. For example, a template presentation can specify that the highest relevancy content item is displayed first, followed by the second highest relevancy content item, and so forth.

In some implementations, curated content can be provided in a format (e.g., in a browser, template presentation, and the like) that enables a user to scale the content based on a desired resolution. For example, in some implementations, a user can select a relevancy resolution, enabling a user to view just a limited set of the most relevant information for a time period or to take a deep dive into the curated content and view not just the limited set of most relevant content, but a fuller set of content that, while still may have some relevancy for a given time period, may be deemed less relevant over that time period. Similarly, in some implementations, a user can select a time resolution, enabling a user to view content determined to be relevant over different time periods. Such an interface can allow a user to dynamically explore their curated content in both relevancy and time dimensions.

The curated content can be provided to the user at or near the predefined time. In some implementations, a push notification, email, text, and the like, can be provided to the user to inform the user that new curated content is available for viewing. In some implementations, the curated content need not be presented to the user at the predefined time, but can be stored with metadata indicating the predefined time, and the user can access the curated content at a time of their choosing.

In some implementations, content can be curated in advance of the predetermined time. Because new structured content may be added to the content database on an ongoing basis, content may be added after curation that can be of greater relevancy than items contained in the curated content. Similarly, event data can be added to the event database in an ongoing basis or in real-time. In some implementation, when additional content is added to the content database and/or additional event data is added to the event database, the curated content can be updated with the additional content and/or additional event data. Additional event data can be accessed from the event database and/or additional structured content can be accessed from the content database. An updated relevancy profile characterizing the metric of relevancy of at least one of the plurality of structured content items can be determined taking into account the additional event data and/or the additional structured content. Updated second digital content can be generated. The updated second digital content can include updated content and portions thereof, including new additional content and portions thereof. The updated second digital content can be provided for rendering on a device.

Figure 3:
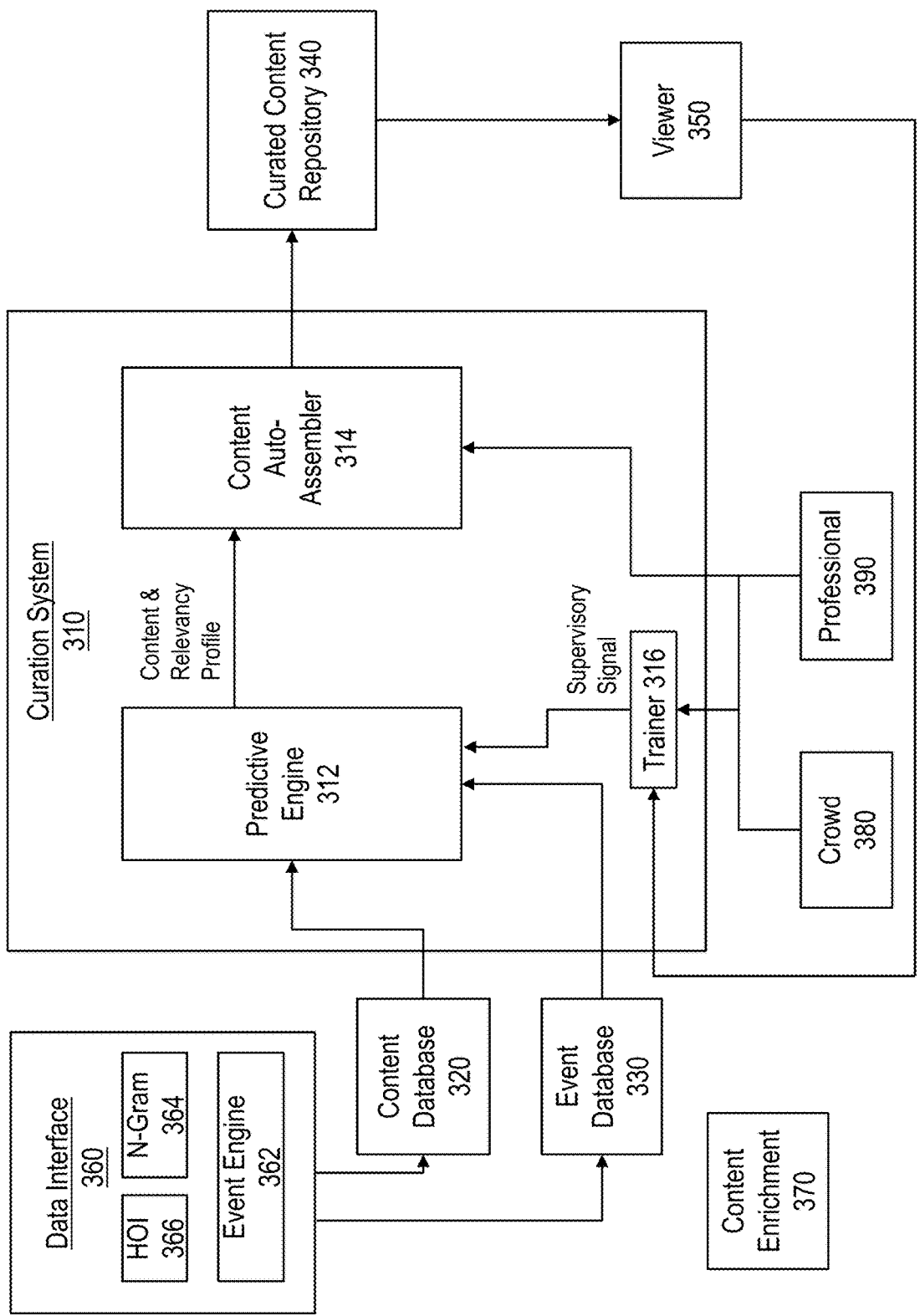
FIG. 3 is a system block diagram illustrating an example system capable of generating curated content that can include content relevant to a user at a contextually relevant time.

FIG. 3 is a system block diagram illustrating an example system 300 capable of generating curated content that can include content relevant to a user at a contextually relevant time. By curating content according to the current subject matter, understanding of a user's digital information can be improved.

The example system 300 includes a curation system 310 communicatively coupled to a structured content database 320, an event database 330, and a curated content repository 340. The curation system 310 can access structured content items and attributes from the structured content database 320, event data and sets of event attributes from the event database 330, and generate curated content items for provision to the curated content repository 340. The curation system 310 can perform, for example, the process 100 illustrated and described with reference to FIG. 1 in order to generate curated content that can include content relevant to a user at a contextually relevant time.

Content database 320 can include a single database; a distributed database; information stored in or on a distributed ledger, and the like. Similarly, event database 330 can include a single database; a distribute database; information stored in or on a distributed ledger, and the like.

Curation system 310 can include a predictive engine 312, a content auto-assembler 314, and a trainer 316. Predictive engine 312 can determine distances within the multi-dimensional namespace between structured content attributes and sets of event attributes of events. Predictive engine 312 can implement machine learning techniques, which can include utilizing a reasoning engine, inference engine, and the like, to map the structured content associated attributes to the sets of event attributes and map the sets of event attributes to the structured content associated attributes. Predictive engine 312 can output the structured content and associated relevancy profile for consumption by the content auto-assembler 314.

The content auto-assembler 314 can include a video engine that performs automated text-to-video conversion utilizing artificial intelligence to produce video content that is indicative of non-video content, such as a transcript of an audio file. The content auto-assembler 314 can receive the structured content and relevancy profile from the predictive engine 312 and, based on this received data, identify which structured content or portions thereof to include in the curated content. For content or portions thereof that are to be included in the curated content, the content auto-assembler 314 can convert any non-video data into video format. The content auto-assembler 314 can generate the curated content and provide the content to the curated content repository 340.

Curated content repository 340 can include a database storing curated content for provision to the user. In some implementations, curated content repository 340 can include a distributed ledger, such as a blockchain storing the curated content.

The example system 300 can include a viewer 350, which can include an interface such as a web portal, application executing on a mobile device, application for interfacing with a blockchain, and the like. The viewer 350 can enable a user to access the curated content repository 340.

The example system 300 can include a data interface 360 that can retrieve digital content associated with the user. In some implementations, the data interface can interact with external systems utilizing application programming interfaces (APIs) to access digital content associated with the user. For example, the data interface 310 can periodically retrieve medical information from a health record management system, social media data from a social media platform, news articles from a news outlet website, heart rate information from a server associated with a wearable device, and the like. The data interface 310 can retrieve digital content from these disparate data sources and convert the digital content into the predefined format to create the structured content including the structured content attributes. The structured content including attributes can be stored in the structured content database 320.

Data interface 360 can retrieve event data associated with the user. In some implementations, the data interface 360 can interact with external components utilizing APIs to access event data associated with the user. For example, the data interface 310 can periodically retrieve calendar information from a digital calendar associated with the user.

In some implementations, data interface 360 can include an event engine 362 that can receive and/or generate event attribute data. For example, a calendar entry may include metadata that can be utilized for creation of the event attribute data, attribute information can be determined from prior events, and the like. For example, the metadata can include attributes from the common namespace. In addition, event engine 362 can generate events by inferring events from retrieved digital content and retrieved event data. For example, an event does not need to be explicitly defined in a calendar, but can be inferred from personnel information, public information, and the like. Inferring of events can be performed according to any number of techniques, for example, utilizing an inference engine, reasoning engine, machine learning, and the like.

In some implementations, data interface 360 can include an N-gram interface 364 that receives content in the form of N-grams and converts the N-gram data to structured content. An N-gram can include a dataset indicative and predictive of fitness of an individual. The fitness can include a numerical index representing a composite effect of various health conditions of the individual including interdependencies of the health conditions. For example, U.S. patent publication 2015/0269321 published Sep. 24, 2015, describes an example personal health operating system capable of generating an N-gram dataset.

Data interface 360 can include a health object identifier interface 366 that can receive digital content in the form of a health object identifier and convert the health object identifier to structured content. A health object identifier can include a patient identifier portion and an object identifier portion. The patient identifier portion can be derived from biometric data of a patient. For example, International Publication Number WO 2012/129372 A2 published Sep. 27, 2012, describes an example healthcare object management systems and methods utilizing health object identifies.

In some implementations, the example system 300 can include content enrichment engine 370 that can enable active enrichment of data contained in the structured content database 320. For example, predictive engine 312 may determine that a certain structured content item is relevant (e.g., likely to have a distance that is within a predefined threshold) to a given event, for example, as described more fully above. When that structured content item is not included in the structured content database 320, predictive engine 320 can indicate to content enrichment engine 370 the content item or type of content that would be relevant to the event. Content enrichment engine 370 can then request additional digital content from a remote resource. For example, if predictive engine 312 determines that a particular news article would be relevant to an upcoming event, the content enrichment engine 370 can request and/or retrieve such news article from a news website.

As noted above, curation system 310 can include a trainer 316 that can be utilized to train predictive models utilized by predictive engine 312. In some implementations, trainer 316 can be included within the predictive engine 312. Training can occur in a number of ways and by a number of individuals. For example, a user viewing curated content in the viewer 360, can be prompted for whether they consider the curated content to be relevant. A user input in response to the prompt can be provided to the trainer 316, which can then provide a supervisory signal to the predictive models utilized by the predictive engine 312 for updating of the predictive models. By receiving feedback from the user regarding relevancy of curated content, the current subject matter can include implementations that are capable of learning and improving over time, including improving the determination of what content is or is not relevant. In some implementations, a user may be prompted for and may provide the metric of relevancy prior to curation of the content.

Similarly, predictive models can be trained via crowd sourcing. For example, structured content and event data (either in a training set or during curation of content) can be provided to remote individuals who can review the structured content and event data and provide an indication of relevancy. In some implementations, such an approach can be implemented in the example system 300 by including a crowdsource engine 380 (e.g., a mechanical turk engine) that can receive a mechanical turk request characterizing a request for a metric of relevancy of each item of structured content; convert the mechanical turk request into a mechanical turk project for submission to mechanical turk workers; receive mechanical turk project results characterizing the metric of relevancy of each of the structured content items; and provide the mechanical turk project results to the predictive engine as a supervisory signal. In some implementations, the crowd may be prompted for and may provide the metric of relevancy prior to curation of the content.

U.S. Pat. No. 9,436,738 granted Sep. 6, 2016, describes an example mechanical turk integrated development environment system that includes one or more interfaces capable of communicating with an example mechanical turk engine.

In some implementations, predictive models can be trained by predetermined subject matter experts. For example, the example system 300 can include one or more user interfaces 390 that can be utilized to provide the structured content and event data to the subject matter experts, prompt them for the metric of relevancy, and receive responses from those subject matter experts. The responses by the subject matter experts can be utilized to train the predictive models (e.g., in the form of a supervisory signal) and/or can be used to create the curated content.

In some implementations, input from the user via viewer 350, from the crowd via the crowdsource engine 380 and from subject matter experts via user interfaces 380 can be used to specify the metric of relevancy for curation of content.

Although a few variations have been described in detail above, other modifications or additions are possible. For example, in some embodiments, the system can generate predictions that are fairly far in the future. As additional information is gained (e.g., new content becomes available, new events are detected, new metadata becomes available, etc.), the system can revise its prediction. Such revisions can be characterized by changes in metrics of relevancy (e.g., distances, etc.). One should appreciate the changes can be described by rates of change or higher order derivatives of change (e.g., $dm/dt$, $d^2m/dt^2$, $d^3m/dt^3$, etc.). Changes in such higher order derivatives can also be part of the metric of relevancy and could be used to force or otherwise trigger presentation of content to the user.

Yet another aspect of the current subject matter includes presenting content as an alert. The urgency or importance of the content can be measured as part of determining the metrics of relevancy. Under nominal circumstances, content can be presented normally according to predictions based on the metrics of relevancy. However, should the urgency or importance of the content satisfy alert criteria, the content can be presented early even though the corresponding temporal event might yet be present. Such an approach can be advantageous because it can permit the user more time to deal with such relevant information then they would have if the received the content only at the point in time of the event.

The subject matter described herein provides many technical advantages. For example, in a traditional setting a user would typically have to submit one or more search queries to a search engine to obtain relevant content. However, based on the disclosed approach, relevant content can be a priori prepared and presented to the user quickly, thereby reducing the amount of time between detection of a relevant event and assembling content to the event. This can be achieved by unifying event information and content information via a common namespace (e.g., normalized attribute value pairs, ontologies, classifications, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   accessing a set of structured content items including multiple news articles from a first database;
   accessing event data from a second database, the event data including sets of event attributes in a multi-dimensional namespace;
   determining a relevancy profile for each of the multiple news articles, the relevancy profile characterizing a metric of relevancy with respect to different perspective attributes over time, wherein the metric of relevancy includes a distance in the multi-dimensional namespace between different perspective attributes associated with the news article and the sets of event attributes;
   ranking the multiple news articles based on their respective metrics of relevancy to a specific one of the different perspective attributes;
   identifying an additional structured content item that would improve an uncertainty measure associated with the ranking;
   generating second digital content including a subset of the multiple news articles based on the ranking; and
   providing the second digital content for rendering on a user interface, wherein a location of each of the multiple news articles within the second digital content rendered on the user interface is based on its ranking according to its respective metric of relevancy, one of the multiple news articles within the second digital content having a highest ranking is rendered at a first location on the user interface, and one of the multiple news articles within the second digital content having a second highest relevancy is rendered at a second location on the user interface.

2. The method of claim 1, wherein the relevancy profile characterizes relevancy with respect to at least one of an absolute time, a relative time, a periodic time, a deterministic time, or a scheduled time.

3. The method of claim 1, further comprising determining the uncertainty measure associated with the determined metric of relevancy for each of the multiple news articles.

4. The method of claim 3, wherein the second digital content includes a representation of the uncertainty measure for each of the multiple news articles.

5. The method of claim 1, wherein determining the relevancy profile is performed using at least one predictive model.

6. The method of claim 5, wherein the at least one predictive model is configured to map the different perspective attributes associated with the multiple news articles to the sets of event attributes.

7. The method of claim 5, wherein the at least one predictive model includes at least one of a Naive Bayes model, a k-nearest neighbor model, a support vector machine model, a random forest model, a neural network, or a logistic regression model.

8. The method of claim 1, further comprising receiving a mechanical turk request characterizing a request for the metric of relevancy of each of the multiple news articles over a respective time interval.

9. The method of claim 8, further comprising:
   converting the mechanical turk request into a mechanical turk project;
   receiving mechanical turk project results from at least one member interface characterizing the metric of relevancy of each of the multiple news articles over the respective time interval; and
   using the mechanical turk project results in generating the second digital content.

10. The method of claim 1, wherein the different perspective attributes associated with the multiple news articles characterize at least one of a creation time of the news article, an open response description of the news article, or a predefined type of content.

11. The method of claim 1, wherein at least one of the first database and the second database includes a distributed ledger.

12. The method of claim 1, further comprising requesting additional digital content associated with the additional structured content item from a remote resource.

13. The method of claim 1, wherein the second digital content is provided as part of a temporal presentation.

14. The method of claim 1, wherein the second digital content includes a video characterizing the ranking of the multiple news articles over time.

15. The method of claim 1, further comprising:
   accessing additional event data from the second database;
   determining an updated relevancy profile characterizing the metric of relevancy of at least one of the news articles over at least a portion of a time interval;
   updating the ranking of the news articles based on the updated relevancy profile; and
   providing updated second digital content for rendering on the user interface.

16. The method of claim 1, wherein the multi-dimensional namespace is structured with a hierarchy.

17. The method of claim 1, further comprising:
   receiving user input in response to the rendering of the second digital content; and
   training a predictive model used in determining the relevancy profile based on the user input.

18. The method of claim 1, wherein the second digital content is rendered within at least one of a webpage, a temporal presentation, or a video.

19. The method of claim 1, wherein generating the second digital content is performed prior to a determinable time of at least one event associated with the event data.

20. The method of claim 1, further comprising receiving a user input selection of a relevancy resolution, wherein providing the second digital content for rendering on a user interface includes:
- providing a limited set of the multiple news articles within the second digital content having a ranking above a threshold in response to the relevancy resolution selected by the user having a first value; and
- providing a full set of the multiple news articles within the second digital content in response to the relevancy resolution selected by the user having a second value.

* * * * *